United States Patent [19]

Desplats

[11] 3,799,503
[45] Mar. 26, 1974

[54] TWIN CLAMP TRACTION APPARATUS FOR CABLES OR RODS

[75] Inventor: André Desplats, Boulogne-Billancourt, France

[73] Assignee: Tractel S.A., Paris, France

[22] Filed: Feb. 7, 1972

[21] Appl. No.: 223,972

[30] Foreign Application Priority Data
Feb. 12, 1971  France .............................. 71.04823

[52] U.S. Cl. .................... 254/73, 254/106, 254/135
[51] Int. Cl. ........................... B66d 1/00, B66f 3/00
[58] Field of Search ............ 254/76, 105, 106, 107, 254/135

[56] References Cited
UNITED STATES PATENTS

| | | |
|---|---|---|
| 2,585,101 | 2/1952 | Faure .................................. 254/76 |
| 2,995,339 | 8/1961 | Persiaux ............................... 254/76 |
| 3,410,525 | 11/1968 | Tanson ............................... 254/105 |

Primary Examiner—Othell M. Simpson
Assistant Examiner—Robert C. Watson

[57] ABSTRACT

The apparatus comprises tandem clamps the movement and the clamping of which are controlled through pairs of links having a cam effect on the clamp jaws. The cam surfaces of the clamping links of each clamp are disposed, in each clamp, symmetrically in reference to a transverse plane perpendicular to the cable axis, so that these clamps are actuated by a system comprising links and a reverse motion crankshaft, this system being constructed similarly to the one comprising links and forward motion crankshaft. The axis of these two crankshafts is disposed in a common fixed plane containing the cable axis and the pivot axis of the clamping links.

4 Claims, 3 Drawing Figures

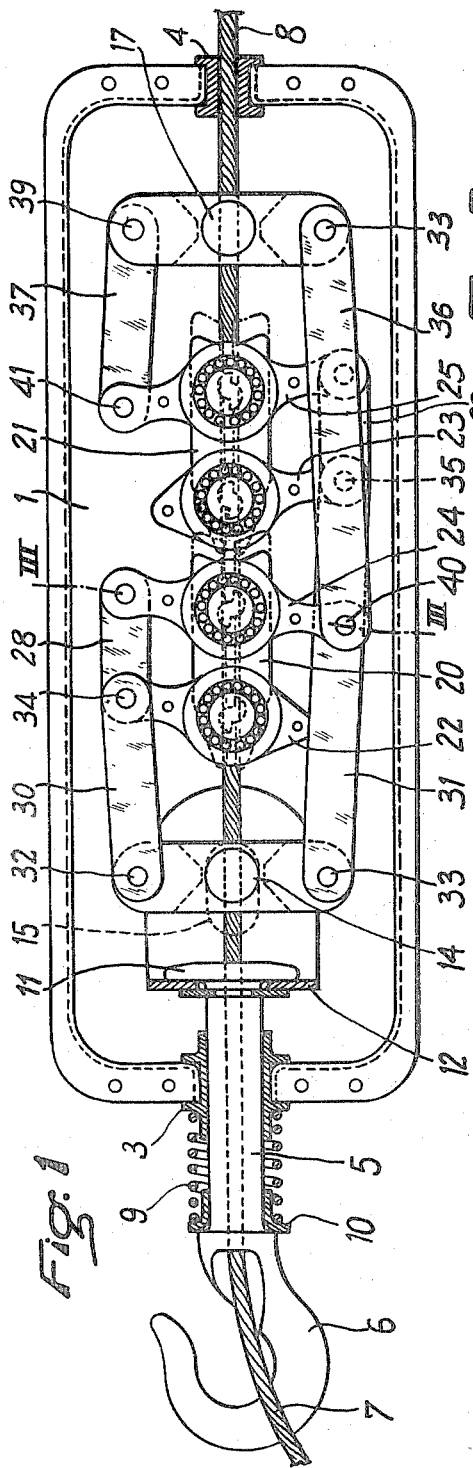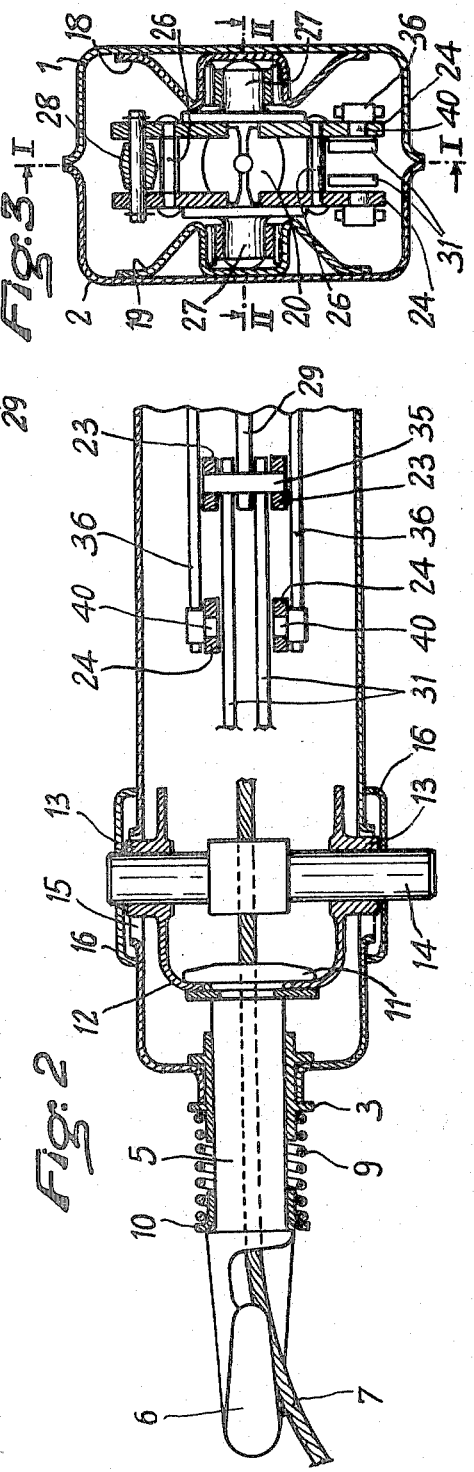

TWIN CLAMP TRACTION APPARATUS FOR CABLES OR RODS

Traction apparatus are already known which are designed for acting upon a cable by means of a pair of self-tightening clamps adapted to perform reciprocating movements in opposite directions to permit the hauling or hauling-off of a load attached to the cable, assuming that the body of the apparatus is anchored to a fixed point. Thus, the hauling or hauling-off is obtained according as the clamps are either tightened by moving away from the end receiving the load-supporting cable, or also tightened but by moving in the opposite direction. The principle of this apparatus is described notably in the U.S. Pat. No. 2,585,101.

In the above-mentioned known apparatus each clamp comprises a pair of lateral supporting plates coupled to control rods and having fulcrumed thereon, for each clamp, two pairs of lateral links acting by cam effect upon a pair of clamping jaws disposed between the links of each pair.

In this known apparatus the reverse-motion mechanism is objectionable in that it is necessarily disposed laterally in relation to the cable axis, thus increasing the over-all dimensions of the apparatus, offsetting the centre of the torque exerted by the operator outside the cable axis, thus creating undesired stress and making it necessary to provide either an aperture in the casing of the apparatus to permit the passage of the reverse-motion control lever, or additional linkage to permit the mounting of this lever like the forward-motion control lever while preserving sufficient clearance to accomodate the service wear of jaws or a possible variation in the cable diameter.

Finally, this known apparatus cannot be used reliably with a rigid rod or a cable behaving like a rigid rod or bar, for the particular arrangement of the component elements of the mechanism does not permit a strictly rectilinear and coaxial translation of the two pairs of jaws along the cable axis.

It is the essential object of the present invention to avoid the various inconveniences set forth hereinabove by providing a reverse-motion mechanism coaxial to the forward-motion mechanism which is of the same design as this forward-motion mechanism and provides consequently the same advantageous features permitting of reversing the direction of the cable driving movement by way of reversing the mode of operation of the clamping members.

Under these conditions, the component elements of the control and coupling mechanism have the same general arrangement, whether for reverse or forward motion, thus reducing considerably the number of different parts in the apparatus.

With the present invention, the mechanism is simplified in comparison with the hitherto known apparatus based on the same principle and at the same time the reverse motion obtained therewith has the same smoothness, efficiency and balance between the points of application of the forces involved, as in the forward-motion mechanism; furthermore, with the arrangement of this invention it is possible on the one hand to impart to the pair of jaws a strictly rectilinear and coaxial movement of translation permitting a reliable operation in the case of a rectilinear rod or bar, or of a cable behaving like a rigid rod or bar, and on the other hand to eliminate the lateral aperture in the casing for the passage of the reverse control lever and/or the additional linkage means detrimental to the mechanical efficiency, while reducing the over-all dimensions of the apparatus.

Finally, this coaxial arrangement is advantageous in that the hook of the apparatus can be utilized directly as a release member as will be explained presently, thus affording an easier release under no-load conditions and an additional, optimum safety when a load is supported by the hook.

In this arrangement, the hauling and hauling-off control actions may advantageously be accomplished by using a pair of transverse crankshafts disposed near the longitudinal ends of the apparatus respectively and coupled directly to the above-defined links in order to exert both forces of translation on both clamps and a tightening force on that one of the two clamps which moves in a predetermined direction for controlling through one crankshaft and in the opposite direction for controlling through the other crankshaft, whereby the hauling and hauling-off actions will be obtained by simply selecting the crankshaft to be actuated with a reciprocating motion, for example by means of an external manual control lever.

Now a typical and exemplary form of embodiment of the apparatus of this invention will be described with reference to the attached drawing, in which:

FIG. 1 is an axial section taken along the joint plane of the two casing halves or shells, as shown by the line I—I of FIG. 3;

FIG. 2 is a fragmentary axial section taken along the line II—II of FIG. 3, and

FIG. 3 is a cross section taken substantially along the line III—III of FIG. 1.

In the example illustrated in the drawing the closed casing of the apparatus comprises two symmetric shells or halves 1, 2 which, when assembled along the joint plane I—I of FIG. 3, provide at the two longitudinal ends of the casing a pair of circular apertures concentric to the longitudinal centre line of the apparatus, these apertures being adapted to receive a pair of corresponding sockets 3 and 4, respectively. The socket 3 has slidably fitted therethrough a hollow rod 5 of an anchoring or fastening member comprising for example a hook 6. The free end 7 of the cable to be hauled or hauled-off is passed through the axial passage of hollow rod 5, and the socket 4 at the opposite end of the apparatus receives therethrough the loaded or working end 8 of said cable. A compression spring 9 mounted externally of the casing between socket 3 and a collar 10 rigid with the hollow rod 5 of the anchoring member constantly urges the casing away from the anchor hook 6 rigidly assembled, by means of the inner head 11 of the anchoring member, with a member 12 carrying lateral bearings 13 for supporting or mounting a forward-motion transverse crankshaft 14. Thus, the pair of bearings 13 can move longitudinally in elongated apertures 15 registering with each other and formed in the casing halves or shells 1, 2, these apertures 15 being closed by a pair of external caps 16 carried by said bearings 13 and adapted to slide on the casing surfaces. Adjacent the opposite end of said casing a reverse-motion transverse crankshaft 17 extends therethrough and is adapted to revolve about an axis fixed in relation to said casing. It is clear that these crankshafts 14 and 17 have adequate configurations providing a free axial passage for the working cable or rod, and that in the case of a rigid working bar or rod substituted for the cable, the hook 6 will be shaped to enable the end 7 to be axially aligned with the inner passage of member 5.

The two casing halves or shells 1, 2 carry each a guide rail designated at 18 and 19, respectively, for the various links controlling the movements of the self-clamping jaws of the pair of the cable-engaging clamps.

Each one of the two clamps of which the jaws are designated by the reference numerals 20 and 21, respectively, comprises two pairs of control links denoted 22, 24 for operating jaws 20, and 23, 25 for operating jaws 21. Each pair of links comprises two lateral links disposed on either side of the jaws actuated thereby for example by acting in a known manner upon cam-forming bosses carried by said jaws and engaging suitable openings formed in said links. The two links of each pair are rigidly assembled by means of transverse riveted pins such as 26. Each one of the four pairs of links 22 to 25 carries on either side, externally, a trunnion such as 27 adapted to pivot and slide in the aforesaid guide rails, for example by means of roller bearings.

Each link is adapted to operate in a known fashion, through cams means, upon the pair of jaws of the clamp with which it is associated, in order to tighten or close these jaws or alternately permitting the release of these jaws according to the direction of the pivotal movement imparted to this link, and the links of the two pairs acting upon the same clamp are maintained in proper parallel relationship by a longitudinal coupling bar disposed between the two pairs. In the example illustrated the cams of said jaws and the corresponding recesses of the links are so designed that the links 22, 24 can tighten the jaws 20 by pivoting in the counter-clockwise direction, and on the other hand the links 23, 25 can tighten the jaws 21 by pivoting in the clockwise direction (as seen in FIG. 1). This arrangement is adapted to correspond to the specific arrangement of the actuating bars coupled to the crankshafts which is described hereinafter.

The links 22 and 23 are each formed with a single hole permitting the coupling thereof with their control member through a transverse pin, and the other links 24 and 25 comprise each two holes for operatively connecting them to their control means. The two pairs of links 22, 24 are interconnected by an upper coupling rod 28, and the other two pairs of links 23, 25 are interconnected by a lower coupling rod 29.

Now the operative connection between the links and the pair of control crankshafts will be described in detail. Crankshaft 14 is connected to the links and therefore to the two clamps through two pairs of connecting rods 30, 31 pivoted to a pair of diametrally opposite crankpins 32 and 33 of this crankshaft. These connecting rods 30, 31 are attached to the upper ends of links 22 and to the lower ends of links 23 respectively by means of pins 34, 35 disposed on either side of the plane containing the axes of the two crankshafts, so that any movement of crankshaft 14 in one or the other direction will cause the two clamps to move in opposite directions so as to tighten the clamp being pulled towards the hook 6 while releasing the clamp pushed in the opposite direction (hauling action).

The crankshaft 17 is connected to the links and therefore to the pair of clamps via two pairs of connecting rods 36 and 37 pivoted to a pair of diametrally opposite crankpins 33 and 39 of crankshaft 17. The connecting rods 36 and 37 are attached to the lower ends of links 24 and to the upper ends of links 25, respectively, through pins 40, 41 disposed on either side of the plane containing the axes of the two crankshafts 14 and 17, whereby any movement of crankshaft 17 in either direction will cause the two clamps to move in opposite directions, thus tightening the clamp moving away from hook 6 and releasing the clamp moving in the opposite direction (hauling-off). It will be noted that in the hauling-off operation the effort transmitted to the clamps is free of any component in a direction transverse to the cable.

The general mode of operation is similar to that of the known apparatus. After the cable (or a rigid rod) has been introduced through the apparatus, a reciprocating motion is applied by means of an external control lever either to crankshaft 14 for hauling the cable or rod, that is, for pulling in its end 8, or to crankshaft 17 for releasing or hauling-off, that is, paying-off in a controlled manner the cable end 8 normally pulled by a load attached thereto. In either case a reciprocating motion attended by a displacement of the two clamps in opposite directions is imparted to the jaws 20, 21 of said clamps. When the hauling crankshaft 14 for tightening the clamp pulled towards the hook 6 is actuated, the cable or rod is hauled, and the hauling-off action is obtained by actuating the other crankshaft 17 since, as already explained hereinabove, in this case it is the clamp moving towards the hook 6 that is released. Upon each reversal of the crankshaft movement the links begin to pivot from one position to the other position, whereby the previously released jaws become tightened while the other jaws are released to permit the sliding movement of the cable or rod towards the hook through the open jaws. Thus considering the position shown in FIG. 1 as the one corresponding to fully-closed jaws, it will be seen that if the crankshaft 14 is actuated in the clockwise direction the jaws 20 will be tightened as they move towards the hook 6 while permitting the release of jaws 21 and moving same backwards.

To obtain the simultaneous opening of jaws 20 and 21 the anchoring member 6 must be pushed inwards against the resistance of its spring, which is positively precluded when a load is pulling the cable end 8 ; any risk of undesired or accidental release of the load is thus safely avoided. It will also be noted that the inward movement of the anchoring member will cause the two crankshafts 14 and 17 to move slightly towards each other, thus causing the simultaneous release or opening of the two pairs of jaws. The action of spring 9 normally tends to move these crankshafts 14 and 17 away from each other and therefore to tighten the jaws, so that this spring 9 will produce a preliminary clamping of the cable as required for obtaining a self-clamping effect.

Since the links 22 to 25 are constantly guided by the rails 18 and 19, they move within the apparatus along a rectilinear path which is consequently also followed by the jaws. Moreover, the use of rolling-contact bearings eliminates any detrimental friction and improves the mechanical efficiency of the apparatus.

It will be noted that as the apparatus is substantially closed the mechanism is safely protected against the ingress of foreign bodies large enough to jam the same during the operation.

Since the simultaneous opening of the clamps is obtained by moving the two crankshafts 14, 17 towards each other and the action exerted by a load supported by the cable end 8 counteracts this movement, any possibility of producing this opening is practically precluded as long as the apparatus is under load. However, it is obvious that additional safety devices may be provided in the apparatus for definitely preventing the operation of the release member.

It will also be noted that as a certain wear develops in the clamping members or the cable, the clamping remains effective due to the automatic displacement of the casing in relation to the anchoring hook. In FIG. 1, assuming that the hook is attached to a fixed point, the casing can move to the right according to the degree of wear of the clamping members, and given a same position of crankshaft 14, the jaws will thus move to the right as shown in dash and dot lines. Therefore, a constant pre-clamping effect is obtained in spite of a possible wear of the cable and/or the jaws, or in spite of the use of a cable of smaller diameter.

It is clear that the specific form of embodiment illustrated in the accompanying drawing and described hereinabove should not be construed as limiting the present invention since various modifications and variations may be contemplated without departing from the scope of the invention. Thus, the anchoring hook and the pivot shaft of the forward-motion crankshaft could be fixed in relation to the casing, and the reverse-motion crankshaft could extend through an elongated aperture formed in said casing, and the pre-tension spring could be interposed between this casing and the reverse-motion crankshaft.

I claim:

1. Traction apparatus for cables or rods comprising tan-dem traction clamps capable of performing simultaneous alternative and reverse movements and to act upon a cable or bar extending through the apparatus, a closed casing, an anchoring member at one end of said casing, a pair of said clamps being disposed within said casing with one clamp in the vicinity of the other clamp in the direction of the cables or bar axis, each clamp of said pair of clamps having a pair of jaws surrounding said cable or bar and presenting a pre-clamping action on said cable or bar, pairs of control links associated to each clamp and presenting cam surface co-acting with cam shaped portions of lateral surfaces of the jaws of each of said clamps, the cam surfaces of the ones of said control links acting on the jaw of the one of said clamps being disposed symmetrically to the cam surfaces of the ones of said control links acting on the jaws of the other of said clamps with relation to a plane perpendicular to the cable or bar axis, a forward motion crankshaft transversely mounted in bearings of said casing, a first connecting rod pivotally connected to an upper extension of said forward motion crankshaft and connected to the control links of one of said clamps, a second connecting rod pivotally connected to a lower extension of said forward motion crankshaft and connected to said control links of the other clamp so that upon the pivoting of said forward motion crankshaft in one or the opposite direction causes the clamping of one of said clamps and the opening of the other clamp and inversely together with a relative axial movement of said two clamps thus insuring the pulling of the cables or bar, a reverse motion crankshaft transversely mounted in bearings of said casing, a third connecting rod connecting said reverse motion crankshaft to said control links of the other of said clamps, a fourth connecting rod connecting said reverse motion crankshaft to said control links of one of said clamps so that upon the pivoting of said reverse motion crankshaft in one or the opposite direction causes, inversely with respect to said forward motion crankshaft, the opening of one of said clamps and the clamping of the other of said clamps together with a relative axial movement between said two clamps insuring the hauling out of the cable or bar, the transverse axis of said forward motion crankshaft and that of said reverse motion crankshaft being disposed in a common fixed plane containing the cable or bar axis and the pivot axis of said control links and at least one of said forward motion crankshaft and reverse motion crankshaft being movable in the direction of the cables or bar axis to adjust the pre-clamping action of said jaws of each of said clamps according to the cable or bar diameter, longitudinal guide rails provided on the inner faces of said casing, and rollers mounted on external faces of said control links, concentrically to their pivot axis, which are adapted to move along said guide rails during the translation motions of said clamps.

2. Apparatus according to claim 1, wherein said casing is provided with a pair of elongated openings facing each other and disposed in the direction of the cable or bar axis, said elongated openings allowing the passage of the forward motion crankshaft and its sliding in the direction of the cable or bar axis, said anchoring member of the apparatus being secured to bearings supporting the forward motion crankshaft.

3. Apparatus according to claim 2, comprising axial openings provided in said casing, a rod sliding in one of said axial openings of the casing and connecting said forward motion crankshaft to said anchoring member, and a spring disposed around said sliding rod between said anchoring member and said casing in order to return said forward motion crankshaft in the direction opposite to the reverse motion crankshaft.

4. Traction apparatus according to claim 1, including a pair of coupling rods and wherein one of said clamps is provided with two pairs of said control links comprising a first pair of control links connected to a lower extension of said reverse motion crankshaft through said fourth connecting rod and connected to a second pair of said control links by one of said coupling rods, said second pair of control links being connected in turn to the upper extension of said forward motion crankshaft through said first connecting rod, while the other of said clamps is also provided with two pairs of control links comprising a first pair of control links connected to an upper extension of said reverse motion crankshaft through said third connecting rod and to a second pair of said control links by a second of said coupling rods, said second pair of control links being connected in turn to the lower extension of said forward motion crankshaft through said second connecting rod.

* * * * *